UNITED STATES PATENT OFFICE.

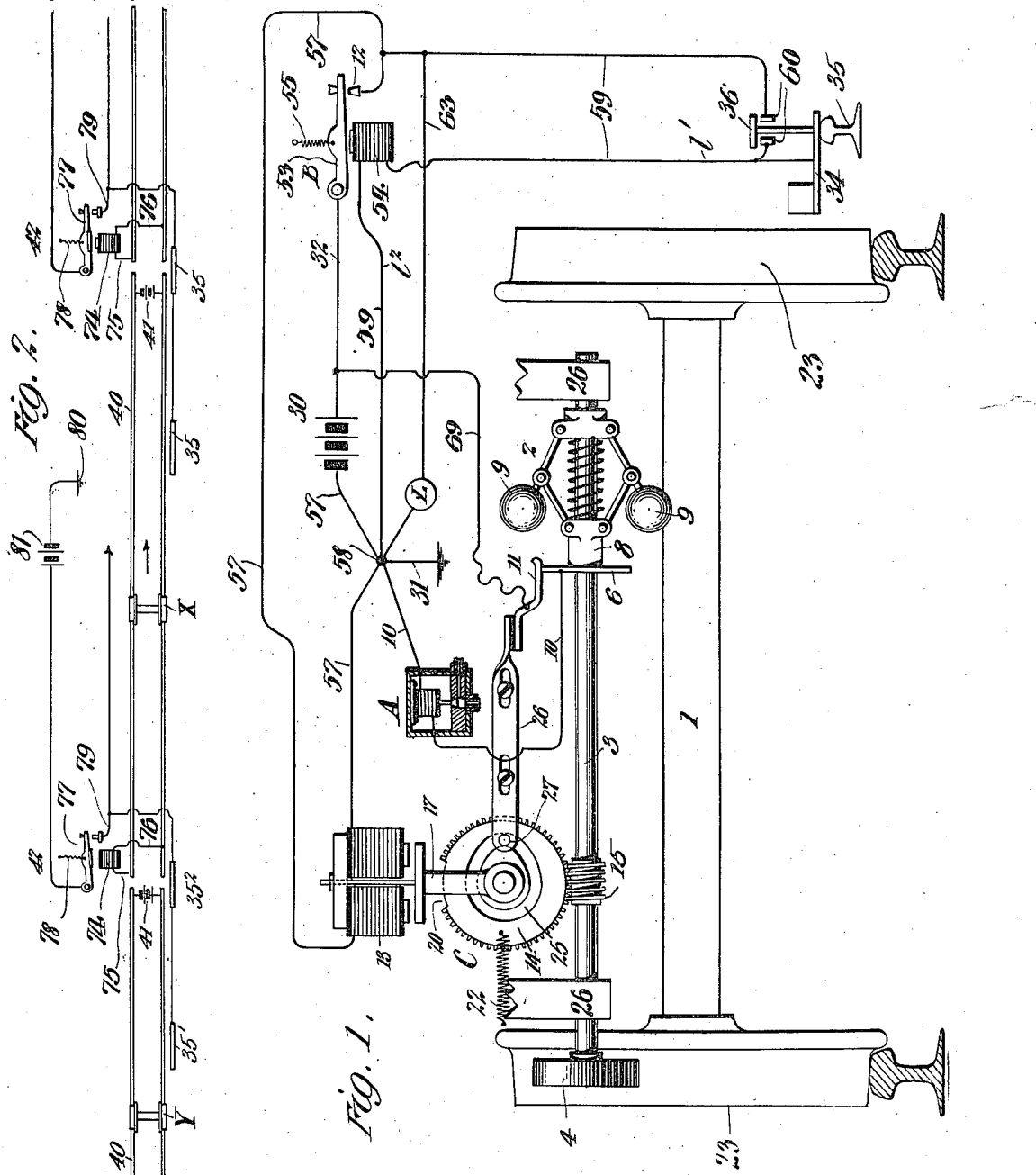

PAUL J. SIMMEN, OF LOS ANGELES, CALIFORNIA.

MEANS FOR CONTROLLING THE MOVEMENT OF VEHICLES.

1,150,309.   Specification of Letters Patent.   Patented Aug. 17, 1915.

Application filed June 19, 1908. Serial No. 439,334.

*To all whom it may concern:*

Be it known that I, PAUL J. SIMMEN, a citizen of the United States, residing at Los Angeles, in the county of Los Angeles and State of California, have invented certain new and useful Improvements in Means for Controlling the Movement of Vehicles, of which the following is a full, clear, and exact description.

This invention relates to a system of control for moving vehicles, either automatically or under the supervision of a central operator. It is distinguished from prior systems of this general character in that the operator on a vehicle is automatically warned by a signal on the vehicle that he is within a danger zone and is given an opportunity to reduce the speed of the vehicle under service conditions. At the same time that he is so warned, there is automatically set in operation a device which thereafter and so long as the danger persists indicates a safe speed for the vehicle. If he heeds the warning and reduces such speed below the permissive rate indicated, nothing occurs, but if he does not heed the warning and exceeds the permissive rate, the brakes on the vehicle are automatically operated and the vehicle is retarded and finally brought to a stop. As soon as the danger has passed there is a clear signal made to the operator on the vehicle, the permissive speed indicator is automatically returned to its maximum position and the vehicle can proceed at any rate below the maximum.

The merit of the invention is that the vehicle is not stopped automatically until after the operator has had an opportunity to reduce his speed to a safe rate and failed to do so; therefore, except in cases where the engineer deliberately disobeys the warning, or is incapacitated from so doing, the vehicle is slowed down or stopped under service conditions and not under emergency conditions.

In the drawings, Figure 1 is a diagram in plan, illustrating the equipment of the track-way. Fig. 2 is a diagram in elevation, illustrating an embodiment of the invention applied to a vehicle, and showing the relation of the parts under "danger" conditions.

In the drawings, there is indicated a single track of railway having two rails, along which vehicles indicated at X and Y travel, and said railway is divided into sections 40. At suitable points along the way, are signal rails in pairs, and designated in the present embodiment 35—35 and 35′—35², one of each pair, as 35 and 35′ being a distant rail, and the others 35 and 35² being home rails.

Each vehicle employs the usual wheels 23 arranged in pairs, and connected by suitable axles 1. Each vehicle also carries a contact shoe, designated 34, and signals and other equipment, as hereinafter explained. Mounted in suitable bearings 26, at any convenient place on the vehicle, is a shaft 3 provided with a worm 15, and motion is imparted to this shaft from the movement of the vehicle wheels by suitable transmitting mechanism, as for example, a friction wheel 4.

Secured to the shaft 3 is an actual speed indicator 2 comprising a collar 8 slidable upon the shaft and carrying a contact disk 6. This indicator is operated by a centrifugal governor in the form of swinging weighted arms 9 pivoted to the shaft and linked to said collar. It is obvious that the longitudinal movement of the collar 8 on the shaft 3 is directly proportional to the speed of the vehicle communicated through the wheel 4 to said shaft. Mounted at a place convenient to the above described actual speed indicator, is a device C, termed a permissive speed indicator. This permissive speed indicator or device comprises a support 17, on which is rotatably mounted a worm gear 14, the teeth of which are adapted to mesh with the worm 15 on the shaft 3. The said teeth of this worm wheel 14 are interrupted at 20, for a purpose which will subsequently be described, and the support 17 is capable of reciprocation, having a portion that constitutes the armature of an electro-magnet 13. The gear wheel 14 is provided with a cam groove 25, in which is engaged a stud 27, secured to a bar 26 that is capable of a reciprocatory movement on the vehicle. The bar 26 carries at its free end a contact member 11 made of suitable conducting material and insulated from said bar. A spring 22, secured to a fixed portion of the vehicle and to the wheel 14, serves to retract said wheel to normal position after its actuation and release.

A magnet-operated train pipe release valve is illustrated diagrammatically at A, being preferably constructed so that as long as the magnet is energized, the valve is closed, but opens upon the deënergization of said magnet. A structure of this character will be well understood to those skilled in the art, and it is believed needs no further explanation.

A battery 30 is placed in any convenient position on the vehicle, and a conductor 32 leads therefrom to the movable contact member 53 of a relay B, the contact member being under constant tension of a spring 55, or under the influence of gravity. The member 53 is adapted to contact with the terminal 12 of a conductor 57 leading to the electromagnet 13, and thence through a binding post 58 or other suitable connecting device, back to the battery 30. From the conductor 57, there is led another conductor 59, to two terminals 60, which are electrically connected by means of a shoe contact 36, and the conductor 59 is led to the relay coil 54, and thence to the post 58. To the conductor 59 is connected a third conductor 63 that is likewise connected to the post 58, and includes a safety signal in the form of a lamp L. A conductor 10 leads from the post 58 to the disk 6 of the actual speed indicator 2, and includes the electro-magnet of the air valve A. The disk 6 is normally in contact with the member 11 of the permissive speed indicator, and a conductor 69 leads from the latter member to the conductor 32, and thence to the battery 30. A conductor 31 leads from the post 58 to a suitable ground connection.

The shoe 34 is mounted on the vehicle at any convenient place, but in a position to ride upon the signal tracks 35—35, 35′ and $35^2$, and the shoe contact member 36 is movable out of and into engagement with the contact terminal 60, accordingly as the shoe 34 is lifted and allowed to fall as it passes over the said signal rails of the system.

Between or near the track rails of each section of the railway, is a battery 41 that is in circuit with a relay coil 74, by means of conductors 75 and 76. Adjacent to this relay coil 74, and actuated thereby, is a swinging contact piece 77 normally held by the relay, against the tension of a spring 78, in contact with a terminal of a conductor 79 in circuit with the two signal rails 35 and 35 or 35′ and $35^2$. The contact piece 77 is furthermore in electrical connection with a battery 81 that is grounded, as illustrated at 80.

The operation of the device is as follows: Assuming that the vehicle X has passed over the signal rails 35′ and $35^2$, when said signal rails were energized, it has deënergized these rails, inasmuch as the current from the battery 41 at the end of the section on which the vehicle X is located, has been short-circuited through the wheels of said vehicle, thereby deënergizing the magnet 74, and permitting the spring 78 to act and open the circuit of the battery 81. When, however, the said vehicle X has passed over the energized signal rails 35′ and $35^2$ at the entrance to the track section, the current from these rails passed through the conductor 59, the relay 54, and the binding post 58 to the ground, thus energizing said relay, attracting the contact 53, and closing a circuit through the terminal 12, conductors 59 and 63, the safety signal lamp L, post 58, conductor 57, battery 30, conductor 32 and contact 53, causing said signal to be displayed. At the same time, another circuit was formed through the terminal 12, conductor 57, electro-magnet 13, battery 30, conductor 32 and contact 53, energizing the electromagnet 13 and lifting the gear wheel 14 out of mesh with the worm 15. As soon as the vehicle has passed the signal rail $35^2$, the member 36 drops by gravity and completes the circuit through the conductor 59 by means of the terminals 60, so that the circuits which were created by passing over the energized signal rails, are maintained by the battery 30 after the engagement with the signal rails has ceased. So long as these circuits are maintained, the terminal 11 of the bar 26 will be in contact with the sliding sleeve 6, and a circuit will be completed through these members, the conductor 69, battery 30, conductor 57, post 58, conductor 10, and electro-magnet of the air brake system, thereby maintaining said release valve closed. With the mechanism in this condition, the position of the bar 26 will be so far to the right that no matter what the speed of the vehicle may be within usual limits, the sliding disk 6 of the actual speed indicator will remain in contact with the member 11 of the permissive speed indicator— that is, under the conditions named, the operator of the vehicle has a safety signal and may maintain any usual speed.

As above explained, the signal rails 35′ and $35^2$, at the beginning of the track section on which the vehicle X is located, are deënergized by the presence of said vehicle in said track section. In Fig. 1, there are represented the conditions which exist if the shoe 34 of this vehicle comes into contact with a deënergized contact rail, as for example, 35′ and $35^2$, at the end of the section in which the vehicle is moving. In such a case, the member 34 lifts the shoe contact 36 from the terminal 60 of the conductor 59, and the magnet 54 will now be deënergized, inasmuch as there is no current flowing through the rail 35. As a consequence the contact 53 moves to open position under the action of the spring 55, thereby opening the circuit 63, which contains the lamp L, and the latter being extinguished as a consequence. At the same time, the current ceases to flow through the conductor 57 and magnet 13, and this magnet being thus deënergized, the supporting frame 17 of the wheel 14 drops, its teeth at once becoming engaged with the worm 15 of the shaft 3, and the permissive speed indicator is thereby thrown into actuation, for as the cam 25 begins to rotate, the bar 26 is moved toward the left by the travel of the pin 27 in the eccentric cam groove 25.

If the operator of the vehicle, as soon as the signal L is extinguished, begins to reduce the speed of the vehicle, the member 6 of the actual speed indicator will begin to move toward the left. So long therefore as the actual speed of the vehicle is less than the permissive speed, as indicated by the position of the contact piece 11, nothing occurs to effect a change in the mechanism; but if the operator does not reduce his actual speed below the permissive speed, the part 11 will separate from the part 6, and therefore the circuit which includes the electrically controlled air release valve A will be broken, and the valve will open, the air will escape, the brakes will be automatically operated, and the speed of the train reduced. The position and shape of the cam groove 25 is such that when the bar 26 is farthest toward the left, as it is when the wheel 14 has completed half of a revolution and the mutilated portion 20 of the gear has reached the worm 15, the permissive speed is a safe one—say ten miles an hour—so that if the operator so controls the vehicle that the actual speed does not exceed this permissive speed, the contact between the elements 6 and 11 will not have been broken, the brakes will not have been set, and the vehicle can continue at that rate under complete control.

The limits of the permissive speed are determined by the extent of the eccentricity of the cam grooves 25, and the length of the bar 26 and its contact element 11. Obviously, if the actual speed of the vehicle is such that the part 6 will slide to the right, out of contact with the member, then the circuit through the electro-magnet controlling the release valve will be broken, and the vehicle will be automatically brought to a stop. Therefore, a determination of the length of the rod or bar assures control of the speed of the vehicle.

When the preceding vehicle has left its track section and enters a succeeding track section, the deënergization of the magnet 13 of the following vehicle is maintained until the latter vehicle reaches the signal rail. Then this rail having again been energized, inasmuch as the preceding vehicle has passed out of the track section into which the succeeding vehicle has entered, the circuits, as above described, are restored in the following vehicle. Consequently the wheel 14 is again lifted out of mesh with the worm 15, the safety signal lamp L is again lighted, and the permissive speed indicator is moved to its normal position, thereby closing the circuit that includes the solenoid of the air valve A. This air valve is consequently closed, and the vehicle is allowed to proceed under normal conditions.

From the foregoing, it is throught that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A system for controlling moving vehicles, comprising a governor having a part displaced in accordance with the speed of the vehicle, means for retarding the movement of the vehicle, a device initially actuable by the relation of the vehicle to exterior objects, means carried by the vehicle for imparting additional movement to said device, and means dependent on a predetermined coöperation between said device and said part for controlling said retarding means.

2. A system for controlling moving vehicles, comprising a governor having a part displaced in accordance with the speed of the vehicle, means for causing a retardation of the movement of the vehicle, a controlling device on the vehicle, means, a portion of which is disposed apart from and outside of said vehicle, for varying the position of said device, means for driving said device when the latter is located in a determined position, a member movable by a part of said device, when the latter is driven in manner aforesaid, said member having a movement corresponding substantially to that of said governor displaced part when the vehicle is normally slowed down from a state of rapid movement, and means for causing an actuation of said retarding means in case said governor displaced part has a movement lagging behind that of said member.

3. In a system for controlling moving vehicles having the usual controlling devices, a governor having a part displaced in accordance with the speed of the vehicle, a cam adapted to be moved by the vehicle, and a contact engaged by said part and displaced by said cam with a movement generally corresponding to the movement of said part when the vehicle slows down from a state of rapid motion under the action of its usual controlling devices.

4. In a system for controlling moving vehicles, a governor having a part displaced in accordance with the speed of the vehicle, a normally stationary gear, a cam operated thereby, a member displaced by said cam, a gear continuously driven by the movement of the vehicle, means for putting said gears into and out of intermeshing relation, and means dependent on predetermined relative movement of said member and said part for effecting a retardation of the vehicle.

5. A system for controlling moving vehicles, comprising a governor having a part disposed in accordance with the speed of the vehicle, means for retarding the movement of the vehicle, a series of separated structures spaced along the track, a device initially actuable by the relation of the vehicle to at least one of said structures, means for imparting a predetermined additional movement to said device, and means upon said device coöperating with said governor part to bring said retarding device into operation only when the train proceeds at more than a predetermined speed after the completion of the said additional movement of said device.

6. A system for controlling moving vehicles, comprising a governor having a part disposed in accordance with the speed of one of said vehicles, means coöperating with said part actuated by the approach of one of said vehicles toward another, speed reducing means controlled by the coöperation of said first mentioned means and said part and operating to reduce when necessary the speed of one of said vehicles down to a predetermined rate and to thereafter permit the continued approach of said vehicle toward and up to the other at a speed not exceeding said rate.

7. A system for controlling moving vehicles comprising a governor having a part disposed in accordance with the speed of one of said vehicles, an electrical circuit controlled by the approach of one of said vehicles toward another, apparatus, comprising an electrical device controlled by said circuit, coöperating with said part, speed reducing means controlled by the aforesaid coöperation of said apparatus and said part and operating to reduce when necessary the speed of one of said vehicles down to a predetermined rate and to thereafter permit the approach of said vehicle toward the other at a speed up to but not exceeding said predetermined rate.

8. A system for controlling moving vehicles comprising a governor, means for actuating said governor in accordance with the speed of the vehicle, a part controlled and movable by said governor, means for retarding the movement of the vehicle, a cam element, means for initially actuating said element, operable by the positioning of said vehicle within a danger zone, means carried by the vehicle for imparting additional movement to said cam element, and means controlled by the interrelated movement of said cam element and said governor moved part for controlling said retarding means.

9. A system for controlling moving track guided vehicles, comprising a device carried by the vehicle and having an element thereof adapted to be displaced in accordance with the advance of said vehicle, means for initially moving a part of said device, said means comprising electrical apparatus, fixed contacts disposed along the track and conductive parts carried by the vehicle, apparatus carried by the vehicle for displacing said element in manner aforesaid after the said part of said device has been initially moved by the said means, governor mechanism comprising a part movable in accordance with the speed of the vehicle, means for retarding the movement of said vehicle, and means controlled by the interrelated movements of said element and said governor part for controlling said retarding means.

10. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to actuate such retarding means when the means on the vehicle moving in accordance with its actual speed and the means on the vehicle moving in accordance with its permissive speed assume a predetermined relation.

11. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to actuate such retarding means when the speed of the means on the vehicle moving in accordance with its actual speed exceeds the speed corresponding to the position of the means on the vehicle moving in accordance with its permissive speed.

12. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to actuate such retarding means when the speed of the means on the vehicle moving in accordance with its actual speed exceeds the speed corresponding to the position of the means on the vehicle moving in accordance with its permissive speed and to cease such actuation whenever the speed of the means moving in accordance with the actual speed of the vehicle is below the speed corresponding to the position of the means that moves in accordance with its permissive speed.

13. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to actuate such retarding means when the means on the vehicle moving in accordance with its actual speed is moved relative to the means on the vehicle moving in accordance with its permissive speed beyond a predetermined limit.

14. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to automatically actuate such retarding means when the speed of the means on the vehicle moving in accordance with its actual speed exceeds the speed corresponding to the position of the means on the vehicle moving in accordance with its permissive speed.

15. A system of control for moving vehicles, comprising means on the vehicle which moves in accordance with the actual speed of the vehicle, further means on the vehicle driven by the running gear thereof which moves in accordance with the permissive speed of such vehicle, means normally inactive adapted to retard the movement of the vehicle, and means adapted to automatically actuate such retarding means when the speed of the means on the vehicle moving in accordance with its actual speed exceeds the speed corresponding to the position of the means on the vehicle moving in accordance with its permissive speed and to cease such actuation whenever the speed of the means moving in accordance with the actual speed of the vehicle is below the speed corresponding to the position of the means that moves in accordance with its permissive speed.

16. In a system of control for moving vehicles, a member on the vehicle which moves in accordance with the permissive speed of the vehicle, means dependent for movement on the movement of the vehicle, for moving such member from a maximum speed position toward a minimum speed position, and means controlled by mechanism outside of the vehicle for automatically restoring such member to a maximum speed position while the vehicle is at different points along its line of travel.

17. A system of control for a moving vehicle, comprising means on the vehicle adapted to move in accordance with its actual speed, means on the same vehicle adapted to move in accordance with its permissive speed, mechanism on the vehicle adapted to operatively connect the permissive speed means to the running gear of the vehicle, and means adapted to set such connecting mechanism in operation automatically.

18. A system of control for a moving vehicle comprising means on one of the vehicles adapted to move in accordance with its actual speed, means on the same vehicle adapted to move in accordance with its permissive speed, mechanism on the vehicle adapted to operatively connect the permissive speed means to the running gear of the vehicle, and means adapted to set such connecting mechanism in operation automatically and to restore it to an inoperative position automatically.

19. A system of control for a plurality of moving vehicles comprising means on one of the vehicles adapted to move in accordance with its actual speed, means on the same vehicle adapted to move in accordance with its permissive speed, mechanism on the vehicle adapted to operatively connect the permissive speed means to the running gear of the vehicle, and means including elements outside of the vehicle adapted to set such connecting mechanism in operation automatically, which means are set in operation by the movement of another of the vehicles.

20. A system of control for a plurality of moving vehicles comprising means on one of the vehicles adapted to move in accordance with its actual speed, means on the same vehicle adapted to move in accordance with its permissive speed, mechanism on the vehicle adapted to operatively connect the permissive speed means to the running gear of the vehicle, and means on another of the vehicles adapted to set such connecting mechanism in operation automatically and to restore it to an inoperative position automatically.

21. In a system of vehicle control, a shaft on a vehicle rotated from its motion, a cam eccentrically mounted and rotated by the shaft, the eccentricity of which corresponds to the maximum and minimum permissive speed of the vehicle, means for controlling the movement of the cam, a member moved from said cam, a second member operatively connected to the running gear of the vehicle and moved thereby in accordance with the actual speed of the vehicle, a brake on the vehicle, and means adapted automatically to operate the brake whenever the two movable members are relatively moved to a predetermined position.

22. In a system of vehicle control, a movable member and means for moving it in accordance with the permissive speed of the vehicle, said means being normally inoperative, means moving in accordance with the actual speed of the vehicle, said means comprising a movable member, the position of which varies with the actual speed of the vehicle at any moment, said two movable members being normally in contact, a brake on the vehicle normally inoperative, and means adapted automatically to operate said brake whenever the contact between the two members is broken.

23. In a system of vehicle control, a movable member, the position of which determines the permissive speed of the vehicle at any moment, and means for moving it in accordance with the permissive speed of the vehicle, said means being normally inoperative, means moving in accordance with the actual speed of the vehicle, said latter means comprising a movable member, the position of which varies with the actual speed of the vehicle at any moment, said two movable members being normally in contact, a brake on the vehicle normally inoperative, and means adapted automatically to operate said brake whenever the contact between the two members is broken, and which means comprise an electrical device with which the two members are in circuit.

24. In a system of vehicle control, a movable member, the position of which determines the permissive speed of the vehicle at any moment, and means for moving it in accordance with the permissive speed of the vehicle, said means being normally inoperative, means moving in accordance with the actual speed of the vehicle, said latter means comprising a movable member, the position of which varies with the actual speed of the vehicle at any moment, two movable members being normally in contact, a brake on the vehicle normally inoperative, and means adapted automatically to operate said brake whenever the contact between the two members is broken, in combination with controlling means adapted to set into operation the means which moves said first named member in accordance with the permissive speed whenever the vehicle is in a position at which it is in danger at its maximum speed.

25. In a system of vehicle control, a movable member, the position of which determines the permissive speed of the vehicle at any moment, and means for moving it in accordance with the permissive speed of the vehicle, said means being normally inoperative, means moving in accordance with the actual speed of the vehicle, said latter means comprising a movable member, the position of which varies with the actual speed of the vehicle at any moment, two movable members being normally in contact, a brake on the vehicle normally inoperative, and means adapted automatically to operate said brake whenever the contact between the two members is broken, in combination with controlling means adapted to set in operation the means which moves in accordance with the permissive speed, said controlling means being controlled by another moving vehicle whenever the vehicle carrying the said means is within an unsafe distance from the second moving vehicle.

26. A system for controlling moving vehicles, comprising a governor having a part disposed in accordance with the speed of one of said vehicles, means coöperating with said part actuated in accordance with conditions along the track, speed reducing means controlled by the coöperation of said first mentioned means and said part and operating to reduce when necessary the speed of said vehicle down to a predetermined rate and to thereafter permit the advance of said vehicle at a speed not exceeding said rate.

27. A system for controlling moving vehicles comprising a governor having a part disposed in accordance with the speed of one of said vehicles, an electrical circuit controlled by track conditions, apparatus, comprising an electrical device controlled by said circuit, coöperating with said part, speed reducing means controlled by the aforesaid coöperation of said apparatus and said part and operating to reduce when necessary the speed of said vehicle down to a predetermined rate and to thereafter permit the approach of said vehicle toward another of said vehicles at a speed up to but not exceeding said predetermined rate.

28. A railway train control system comprising a centrifugal governor geared to a wheel of a railway vehicle, a contact device movable by the governor when its speed is varied, a second contact device coacting with the first, gearing adapted to connect said second contact device with a wheel of said vehicle but arranged to be normally out of connection, means for establishing said geared connection of the second contact device and a vehicle wheel when the vehicle passes a given point, an electric circuit including said contact devices in series, and a translating device governed by said circuit.

29. Safety apparatus for railways, comprising a movable element whose position is controlled by the speed of the vehicle which carries it, another movable element whose position is controlled by the distance traveled by the said vehicle, track controlled means for controlling the operation of the last named movable element, speed controlling means for the vehicle operated by the coöperation of the said two movable elements, together with means for preventing said coöperation and to permit the train to proceed at a reduced speed, substantially as described.

30. Safety apparatus for railways, comprising a movable element whose position is controlled by the speed of the vehicle which carries it, another movable element whose position is controlled by the distance traveled by the said vehicle, track controlled means for controlling the operation of the last named movable element, speed controlling means for the vehicle, an electromagnetic device for controlling the operation of the speed controlling means, and an electric circuit for said device, the two movable elements having coöperative means for controlling said circuit, together with means for limiting the movement of the second named movable element to prevent the operation of the speed controlling means when the speed of the train is below a predetermined maximum, substantially as described.

In witness whereof, I subscribe my signature, in the presence of two witnesses.

PAUL J. SIMMEN.

Witnesses:
WALDO M. CHAPIN,
MARY S. HANDY.